(12) United States Patent
Ishimoto

(10) Patent No.: US 8,170,353 B2
(45) Date of Patent: May 1, 2012

(54) INFORMATION PROCESSING APPARATUS AND CONTROL METHOD THEREOF

(75) Inventor: Koichi Ishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/693,596

(22) Filed: Jan. 26, 2010

(65) Prior Publication Data

US 2010/0123936 A1 May 20, 2010

Related U.S. Application Data

(62) Division of application No. 11/934,346, filed on Nov. 2, 2007, now Pat. No. 7,706,620.

(30) Foreign Application Priority Data

Nov. 27, 2006 (JP) ................................. 2006-318863

(51) Int. Cl.
*G06K 9/36* (2006.01)
(52) U.S. Cl. ........ 382/232; 382/235; 382/239; 382/251; 715/535; 715/536; 715/542; 715/523
(58) Field of Classification Search .................. 382/232, 382/235, 239, 251; 715/535, 536, 542, 523
See application file for complete search history.

(56) References Cited

U.S. PATENT DOCUMENTS

| 4,633,326 | A | * | 12/1986 | Endoh et al. ................... 358/406 |
| 7,289,245 | B2 | * | 10/2007 | Kagawa .......................... 358/1.9 |
| 2003/0133154 | A1 | | 7/2003 | Ohyama et al. ............... 358/1.15 |
| 2004/0150859 | A1 | | 8/2004 | Hayashi ........................ 358/3.28 |
| 2006/0221415 | A1 | * | 10/2006 | Kawamoto .................... 358/518 |

FOREIGN PATENT DOCUMENTS

| CN | 1432903 A | 7/2003 |
| EP | 0 552 960 A1 | 1/1993 |
| JP | 2004-228896 | 8/2004 |

OTHER PUBLICATIONS

Chinese Office Action of Chinese Patent Application No. 200710194867.5, dated May 8, 2009.

* cited by examiner

*Primary Examiner* — Mike Rahmjoo
(74) *Attorney, Agent, or Firm* — Fitzpatrick, Cella, Harper & Scinto

(57) ABSTRACT

The present invention provides an information processing apparatus and control method thereof and a storage medium that stores its control program capable of generating a code image with the optimum device in accordance with the amount and/or contents of the information to be encoded, and/or considering the load of the equipment. The information processing apparatus is electrically connected to an image processing apparatus, and includes: a deciding section for deciding on whether to generate a code image by encoding information or to issue a command for causing to generate the code image by encoding the information; and a processing section for generating, when the deciding section decides to generate, the code image by encoding the information and transmitting it to the image processing apparatus, and for transmitting, when the deciding section decides to issue, the command to the image processing apparatus.

9 Claims, 15 Drawing Sheets

INFORMATION TO BE ENCODED

☑ PRINT TIME

☐ USER INFORMATION OF HOST COMPUTER

☐ USER INFORMATION OF IMAGE
  FORMING APPARATUS

INFORMATION PROCESSING APPARATUS AND CONTROL METHOD THEREOF

CROSS REFERENCE TO RELATED APPLICATION

The present application is a division of U.S. application Ser. No. 11/934,346 filed on Nov. 2, 2007 now U.S Pat. No. 7,706,620, the entire disclosure of which is incorporated by reference herein.

BACKGROUND OF THE INVENTION

1. Field of the Invention

The present invention relates to an information processing apparatus and a control method thereof capable of handling code images.

2. Description of Related Art

Japanese Patent Laid-Open No. 2004-228896 proposes a technique (an encoding processing technique) of recording or printing on the same sheet a code image obtained by encoding information annexed to an image together with original image information for improving convenience of the copyright management or secondary use of the image information. Here, the term "code image" refers to an image such as a two-dimensional code image and a bar code image, and an electronic watermark image generated by electronic watermarking technology.

To use the technique disclosed in the foregoing Japanese Patent Laid-Open No. 2004-228896, however, an image processing apparatus such as an image forming apparatus must always carry out the encoding processing.

Generally, compared with the image processing apparatus, a host computer that gives it a printing command has higher computing ability. Accordingly, as for the complicated encoding processing that requires much time for calculation, it is preferable that the host computer side with higher computing ability perform it.

In addition, information to be encoded is not always placed on the side of the image processing apparatus. For example, the information retained at the host computer side such as user information of the host computer can also include information to be subjected to the encoding processing.

On the other hand, it is not always reasonable for the host computer side to carry out the encoding processing. For example, there is information to be subjected to the encoding processing at the image processing apparatus side such as print time information.

SUMMARY OF THE INVENTION

The present invention is implemented to solve the foregoing problems. It is therefore an object of the present invention to provide the following information processing apparatus and control method thereof.

In the first aspect of the pre sent invention, there is provided an information processing apparatus electrically connected to an image processing apparatus, said information processing apparatus comprising: deciding means for making a decision on whether to generate a code image by encoding information or to transmit to said image processing apparatus a command for causing to generate the code image by encoding the information; and processing means for generating, when said deciding means makes a decision to generate the code image, the code image by encoding the information, and for transmitting the code image to said image processing apparatus, and for transmitting, when said deciding means makes a decision to transmit the command, the command to said image processing apparatus.

In the second aspect of the present invention, there is provided a control method in an information processing apparatus electrically connected to an image processing apparatus, said control method comprising: a deciding step of making a decision on whether to generate a code image by encoding information or to issue a command for causing to generate the code image by encoding the information; a step of generating, when said deciding step makes a decision to generate, the code image by encoding the information, and for transmitting the code image to said image processing apparatus; and a step of transmitting, when said deciding step makes a decision to issue, the command to said image processing apparatus.

In the third aspect of the present invention, there is provided a computer readable storage medium that stores control program of an information processing apparatus electrically connected to an image processing apparatus, said control program comprising: a deciding step of making a decision on whether to generate a code image by encoding information or to issue a command for causing to generate the code image by encoding the information; a step of generating, when said deciding step makes a decision to generate, the code image by encoding the information, and for transmitting the code image to said image processing apparatus; and a step of transmitting, when said deciding step makes a decision to issue, the command to said image processing apparatus.

According to the present invention, the optimum entity can form a code image in accordance with the amount and contents of the information to be encoded and/or considering the load of the equipments.

Further features of the present invention will become apparent from the following description of exemplary embodiments (with reference to the attached drawings).

BRIEF DESCRIPTION OF THE DRAWINGS

FIG. 15 is a diagram showing an example of the operation screen of the PC 40 of the third embodiment.

DESCRIPTION OF THE EMBODIMENTS

Figure 1:
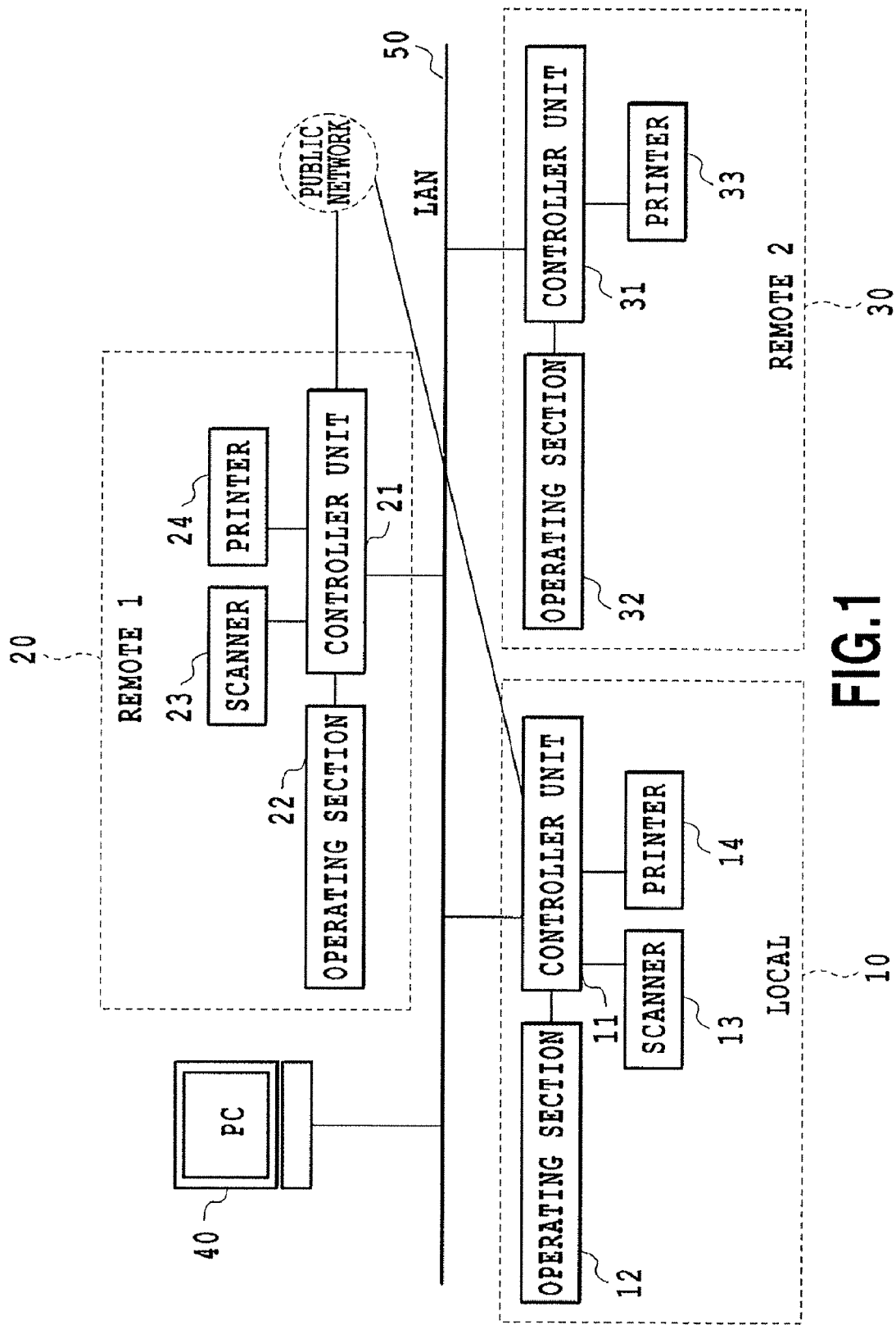
FIG. 1 is a block diagram showing an entire configuration of a printing system of a first embodiment in accordance with the present invention.

The best mode for carrying out the present invention will now be described with reference to the accompanying drawings.

(First Embodiment)

First, referring to the drawings, a printing system of a first embodiment in accordance with the present invention will be described in detail.

FIG. 1 is a block diagram showing a configuration of the printing system of the first embodiment.

The system as shown in FIG. 1 has a host computer 40 and three image forming apparatuses (10, 20, 30) connected to a LAN 50. The printing system in accordance with the present invention, however, is not limited to these numbers of devices connected. In addition, although the present embodiment employs the LAN as a connecting means, it is not limited to it. For example, connections through any networks are possible such as a WAN (public networks), serial transmission systems such as a USB, and parallel transmission systems such as a Centronics interface and SCSI.

The host computer (referred to as "PC" from now on) 40, an information processing apparatus, has functions of the so-called personal computer. The PC 40 can transmit and receive files using an FTP or SMB protocol via the LAN 50 or WAN, or can transmit and receive electronic mail. In addition, the PC 40 can issue a printing command to the image forming apparatuses 10, 20 and 30 via a printer driver.

The image forming apparatuses 10 and 20 are devices with the same configuration. The image forming apparatus 30 is an image forming apparatus having only a printing function, and does not have a scanner section which the image forming apparatus 10 or 20 has. In the following description, for the sake of simplicity, focusing attention to the image forming apparatus 10 in the image forming apparatuses 10 and 20, its configuration will be described in detail.

The image forming apparatus 10 comprises a scanner section 13 constituting an image input device, a printer section 14 constituting an image output device, a controller 11 for carrying out operation control of the image forming apparatus 10 in its entirety, and an operating section 12 constituting a user interface (UI).

Figure 2:
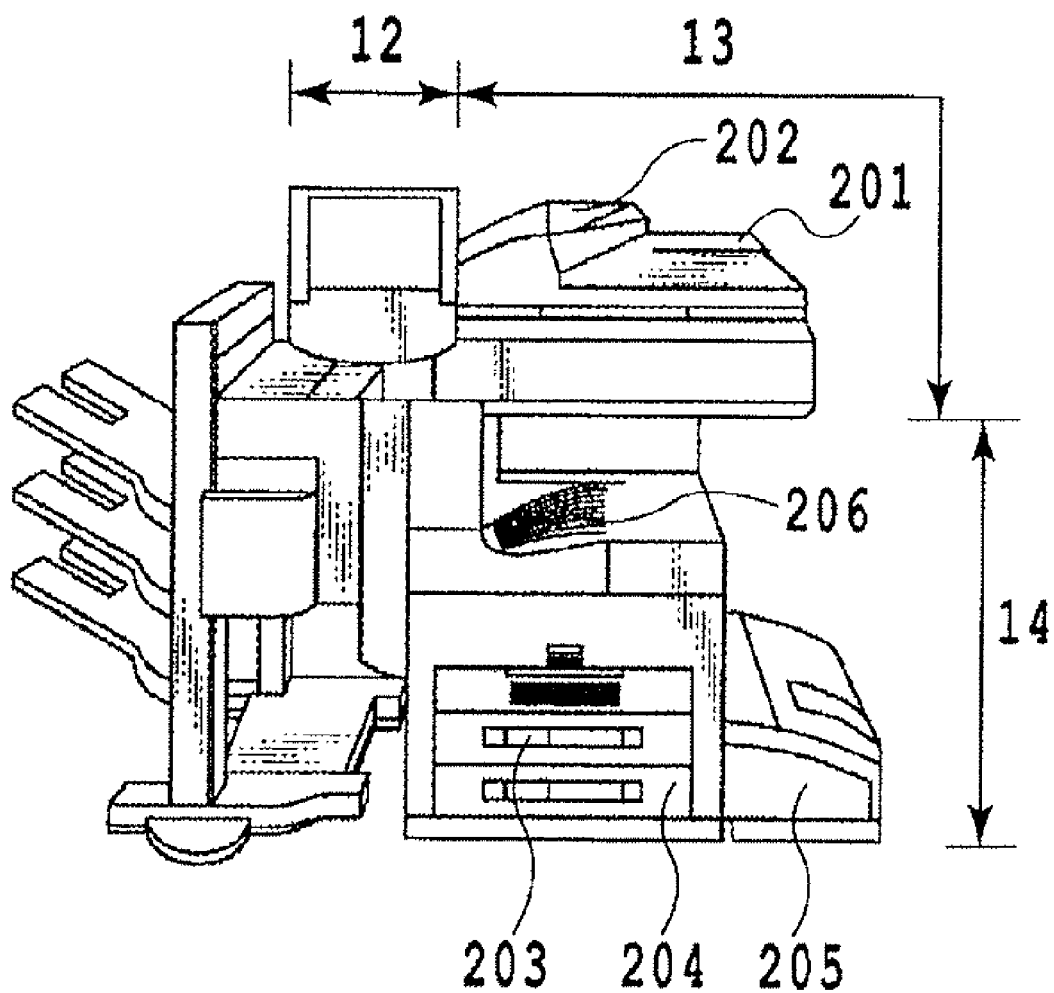
FIG. 2 is an exterior view of an image forming apparatus of the embodiment.

Here, the external appearance of the image forming apparatus 10, which is shown in FIG. 2, will be described with reference to the view.

The scanner section 13 converts image information into an electric signal by inputting to a CCD the reflected light obtained by performing exposure scanning of the image on an original document. The scanner section 13 further converts the electric signal to a luminance signal consisting of R, G, and B colors, and supplies the luminance signal to the controller 11 as image data.

The original document is placed on a tray 202 of a document feeder 201. When a user instructs to start reading from the operating section 12, the controller 11 gives the scanner section 13 an original document read command. Receiving the command, the scanner section 13 feeds the original document one by one from the tray 202 of the document feeder 201, and reads the original document. As for the reading method of the original document, instead of the automatic feeding method using the document feeder 201, a method is also possible which scans the original document by placing it on a glass plate not shown and by moving an exposure section.

The printer section 14 is an image forming device for forming image data received from the controller 11 on paper. In the present embodiment, although the image forming system consists of an electrophotographic system using a photoconductive drum or a photoconductive belt, the present invention is not limited to it. For example, an ink-jet system is also applicable which expels inks from a minute nozzle array to print on paper. The printer section 14 includes a plurality of paper cassettes 203, 204, and 205, which enable selection of a different paper size or different paper direction. A paper output tray 206 receives paper after printing.

Next, a configuration of the controller 11 of the image forming apparatus 10 will be described in detail.

Figure 3:
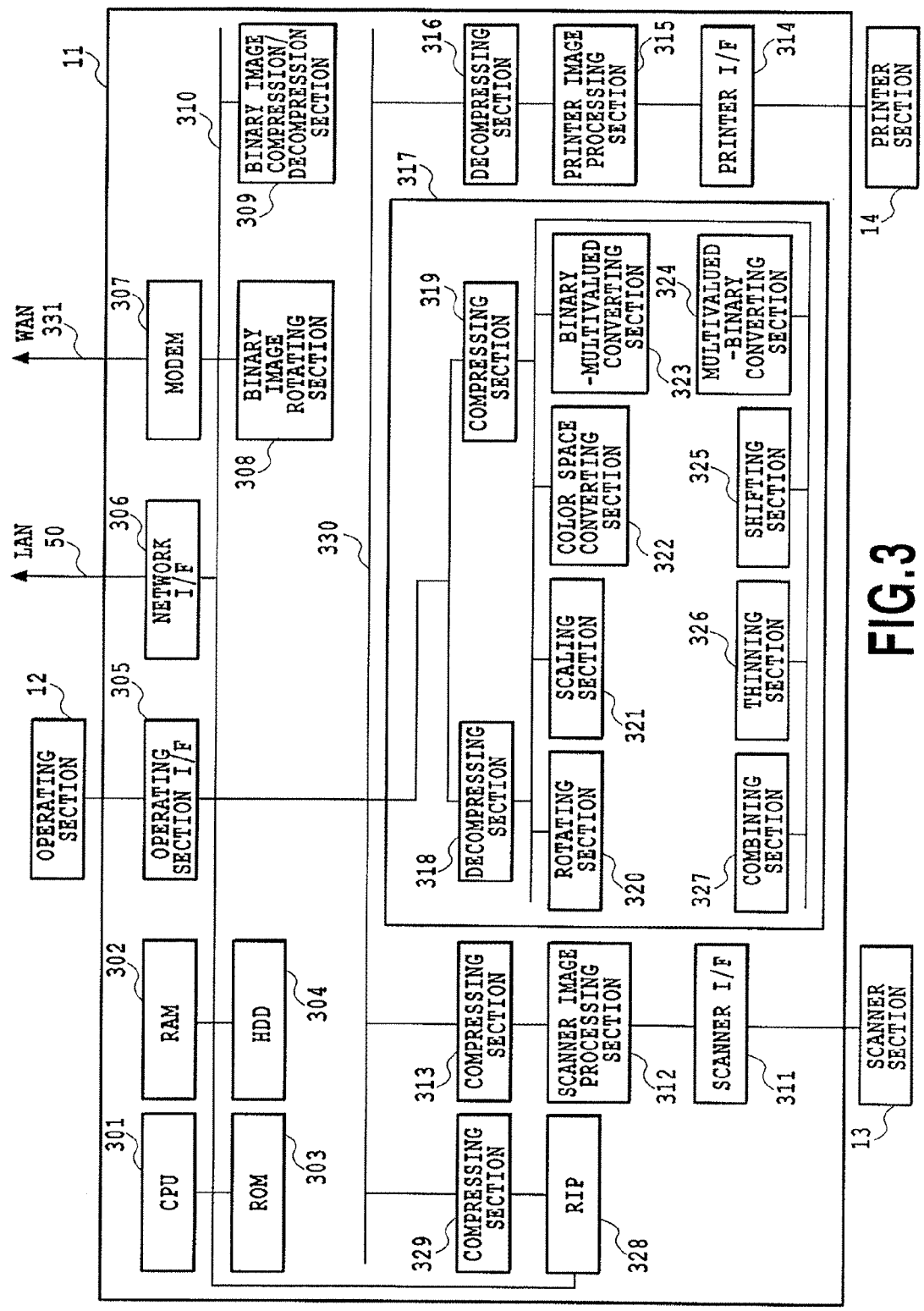
FIG. 3 is a block diagram showing an entire configuration of the image forming apparatus of the embodiment.

FIG. 3 is a block diagram for describing the configuration of the controller 11 in more detail.

The controller 11 is electrically connected to the scanner section 13 and printer section 14 on one hand, and is connected to the PC 40 or external apparatus via the LAN 50 or WAN 331 on the other hand. This enables the input and output of the image data and device information.

A CPU 301 achieves centralized control of accesses to individual devices connected thereto according to control programs and the like stored in a ROM 303, and centralized control of various processings carried out inside the controller 11.

A RAM 302, which is a system work memory for the CPU 301 to operate, is a memory for temporarily storing image data. The RAM 302 consists of a SRAM that retains the stored contents after turning the power off and a DRAM whose contents are erased after turning the power off. The ROM 303 stores a boot program and the like of the apparatus. An HDD 304 is a hard disk drive capable of storing system software and image data.

An operating section I/F 305 is an interface for connecting a system bus 310 and the operating section 12. The operating section I/F 305 receives the image data to be displayed on the operating section 12 from the system bus 310 and supplies to the operating section 12, and supplies the information input from the operating section 12 to the system bus 310.

A network I/F 306 is connected to the LAN 50 and the system bus 310, and performs input and output of information. A modem 307 is connected to the WAN 331 and the system bus 310, and performs input and output of information. A binary image rotating section 308 converts the direction of the image data before transmission. A binary image compression/decompression section 309 converts the resolution of the image data before transmission to a prescribed resolution or to a resolution matching the capacity of a party. The compression and decompression are carried out using a JBIG, MMR, MR or MH system. An image bus 330 is a transmission line for exchanging the image data, and consists of a PCI bus or IEEE 1394.

A scanner image processing section 312 carries out correction, processing and editing of the image data received from the scanner section 13 via a scanner I/F 311. Besides, the scanner image processing section 312 makes a decision on whether the received image data is a color original document or a black-and-white original document, or a text original document or a photographic original document. Then, it attaches the decision result to the image data. Such collateral information is referred to as attribute data. Details of the processing the scanner image processing section 312 performs will be described later.

Figure 4:
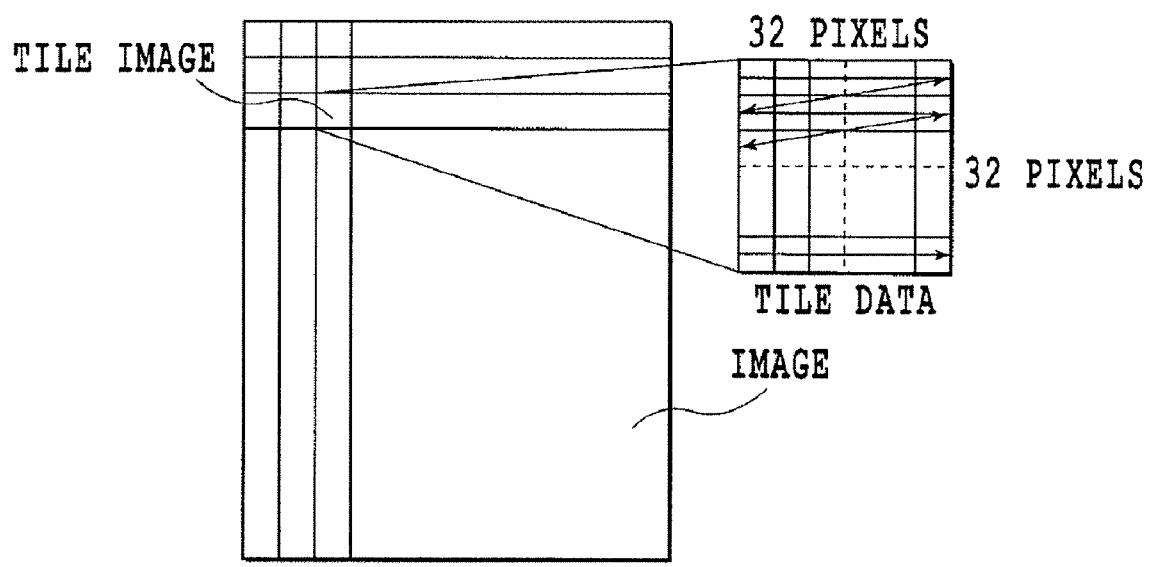
FIG. 4 is a schematic diagram illustrating tile data.

A compressing section 313 receives the image data, and divides the image data to blocks each consisting of 32 pixels× 32 pixels. Each 32×32 pixel image data is referred to as tile data. FIG. 4 schematically illustrates the tile data. In the original document (paper medium before read), each region corresponding to the tile data is referred to as a tile image. To the tile data, average luminance information in the 32×32 pixel block and the coordinate position of the tile image on the original document are added as header information. In addition, the compressing section 313 compresses the image data consisting of a plurality of tile data. A decompressing section 316 decompresses the image data consisting of a plurality of tile data, and then develops into a raster, and delivers to a printer image processing section 315.

The printer image processing section 315 receives the image data delivered from the decompressing section 316, and performs image processing on the image data with referring to the attribute data annexed to the image data. The image data passing through the image processing is supplied to the printer section 14 via a printer I/F 314. Details of the processing carried out by the printer image processing section 315 will be described later.

An image converting section 317, which performs prescribed converting processing on the image data, consists of the following processing sections.

A decompressing section 318 decompresses the received image data. A compressing section 319 compresses the received image data. A rotating section 320 rotates the received image data. A scaling section 321 performs resolution converting processing (from 600 dpi to 200 dpi, for example) of the received image data.

A color space converting section 322 converts the color space of the received image data. The color space converting section 322 can carry out known groundwork skipping processing using a matrix or table prepared in advance, known LOG converting processing (RGB→CMY) or known output color correcting processing (CMY→CMYK).

A binary-multivalued converting section 323 converts received binary gradation image data to 256-step gradation image data. In contrast, a multivalued-binary converting section 324 converts received 256-step gradation image data to binary gradation image data by a technique such as error diffusion processing.

A combining section 327 combines two received image data to generate a piece of image data. To combine two image data, such a method is applied that uses the average value of the luminance values of the corresponding pixels to be combined as a composite luminance value, or that uses the luminance value higher in the luminance level between the corresponding pixels as the luminance value of the composite pixels. In addition, a method of using darker pixels as the composite pixels is also possible. Furthermore, a method that determines the composite luminance value according to OR, AND or XOR operation between the pixels to be combined is also applicable. These combining methods are all well-known techniques.

A thinning section 326 carries out resolution conversion by thinning out the pixels of the received image data, and generates image data with a size of ½, ¼, ⅛ and the like. A shifting section 325 gives a margin to the received image data or eliminates the margin.

An RIP (Raster Image Processor) 328 receives intermediate data generated from PDL data transmitted from the PC 40, and generates (multivalued) bit map data. A compressing section 329 compresses the bit map data generated by the RIP 328.

Figure 5:
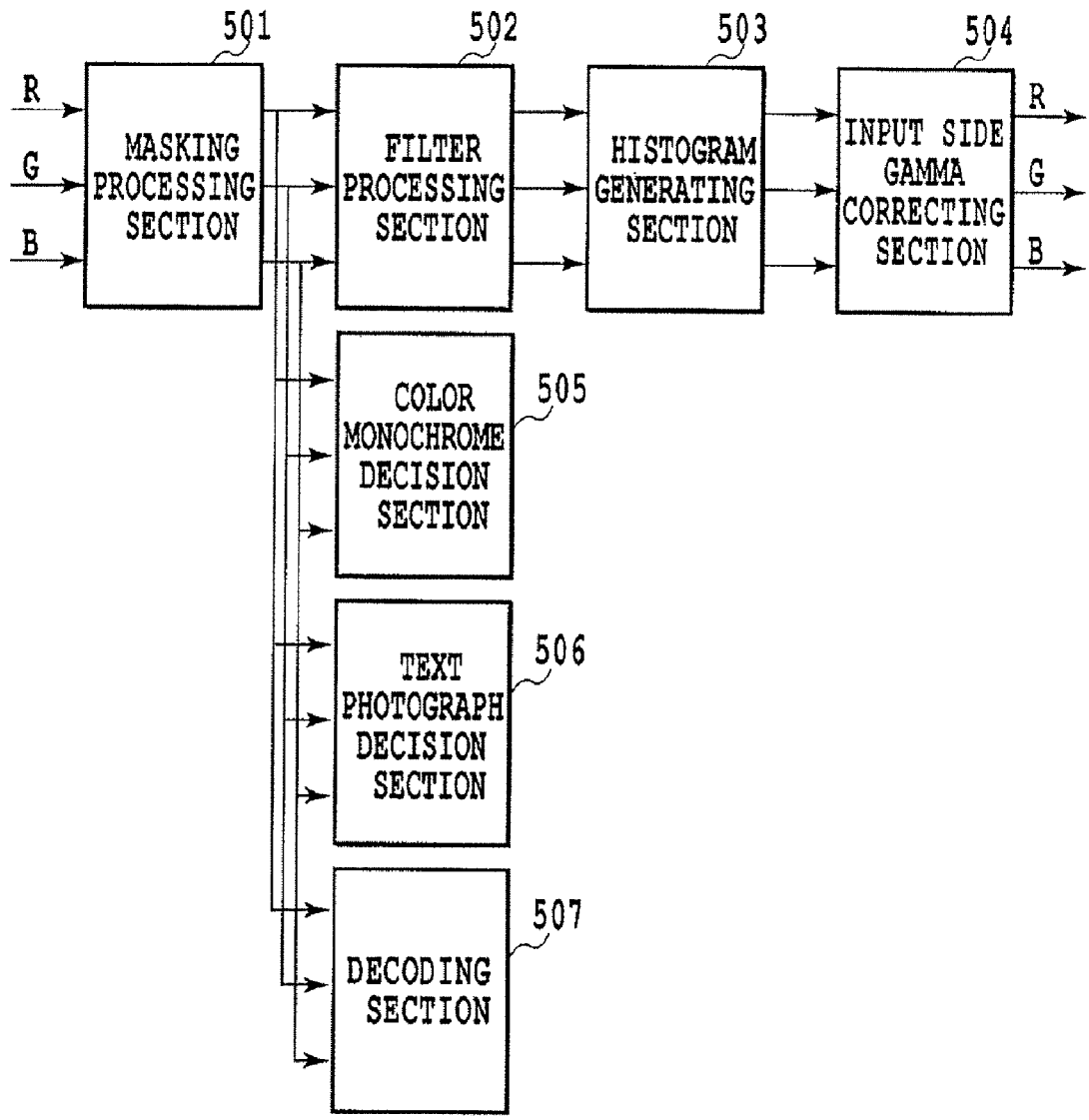
FIG. 5 is a block diagram showing a configuration of a scanner image processing section of the first embodiment.

Here, an internal configuration of the scanner image processing section 312 will be described. FIG. 5 shows the internal configuration of the scanner image processing section 312.

The scanner image processing section 312 receives the image data composed of RGB luminance signals each consisting of eight bits. The luminance signals are converted to standard luminance signals independent of the filter color of a CCD by a masking processing section 501.

A filter processing section 502 arbitrarily corrects the spatial frequency of the received image data. This processing section performs arithmetic processing on the received image data using a 7×7 matrix, for example.

Figure 7:
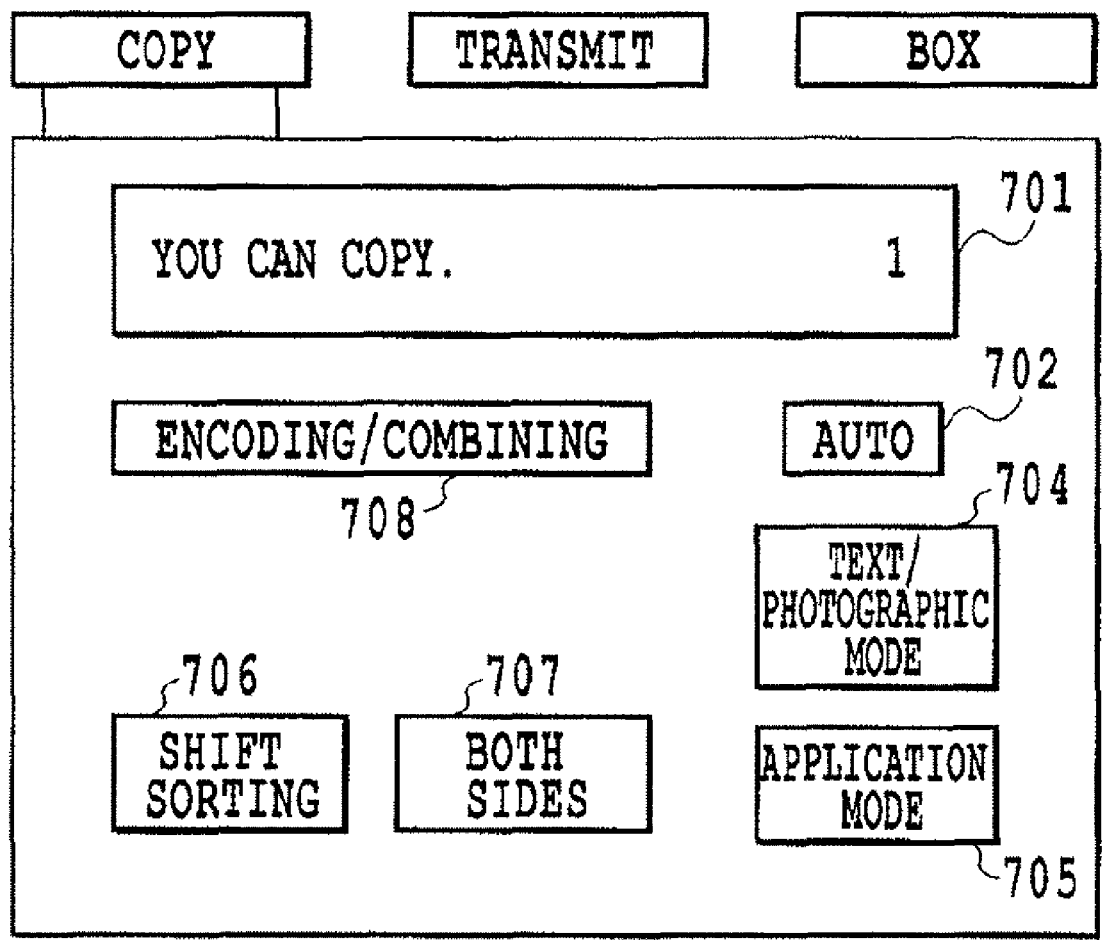
FIG. 7 is an example of the display screen of an operating section of the first embodiment.

Incidentally, in a copying machine or multifunction machine, it is possible to select a text mode, a photographic mode or a text/photographic mode as a copy mode by depressing a tab 704 of the operating section 12 shown in FIG. 7. When the user selects the text mode, the filter processing section 502 places a filter for text on the entire image data. When the user selects the photographic mode, it places a filter for photograph on all the image data. In addition, when the user selects the text/photographic mode, it adaptively switches a filter for each pixel in accordance with a text/photograph decision signal (part of the attribute data) which will be described later. Thus, a decision is made for each pixel on whether to place the filter for photograph or for text.

As for the filter for photograph, such a coefficient that enables smoothing of only high frequency components is set to prevent image roughness. On the other hand, as for the filter for text, such a coefficient that enables considerable edge emphasis is set to sharpen the text.

A histogram generating section 503 samples the luminance data of the individual pixels constituting the received image data. More specifically, it samples the luminance data in a rectangular region enclosed from a start point to an end point designated in the main scanning direction and subscanning direction at a fixed pitch in the main scanning direction and subscanning direction. Then, it generates the histogram data from the sampled results. The generated histogram data can be used to estimate the groundwork level when carrying out the groundwork skipping processing.

An input side gamma correcting section 504 converts to luminance data having nonlinear characteristics by using a table or the like for gamma correction prepared in advance.

A color monochrome decision section 505 decides on whether the individual pixels constituting the received image data are a chromatic color or an achromatic color, and annexes the decision results to the image data as a color monochrome decision signal (part of the attribute data).

A text photograph decision section 506 makes a decision on whether each pixel constituting the image data is a pixel constituting text, a pixel constituting a halftone dot, a pixel constituting text in halftone dots, or a pixel constituting a solid image from the pixel value of each pixel and pixel values of its neighboring pixels. The pixels that cannot be classified to any one of them are pixels constituting a white region. Then, the decision results are annexed to the image data as a text/photograph decision signal (part of the attribute data).

A decoding section 507 detects, when the image output from the data masking processing section 501 includes code image data, its existence. Then, it extracts information by decoding the detected code image data.

Figure 6:
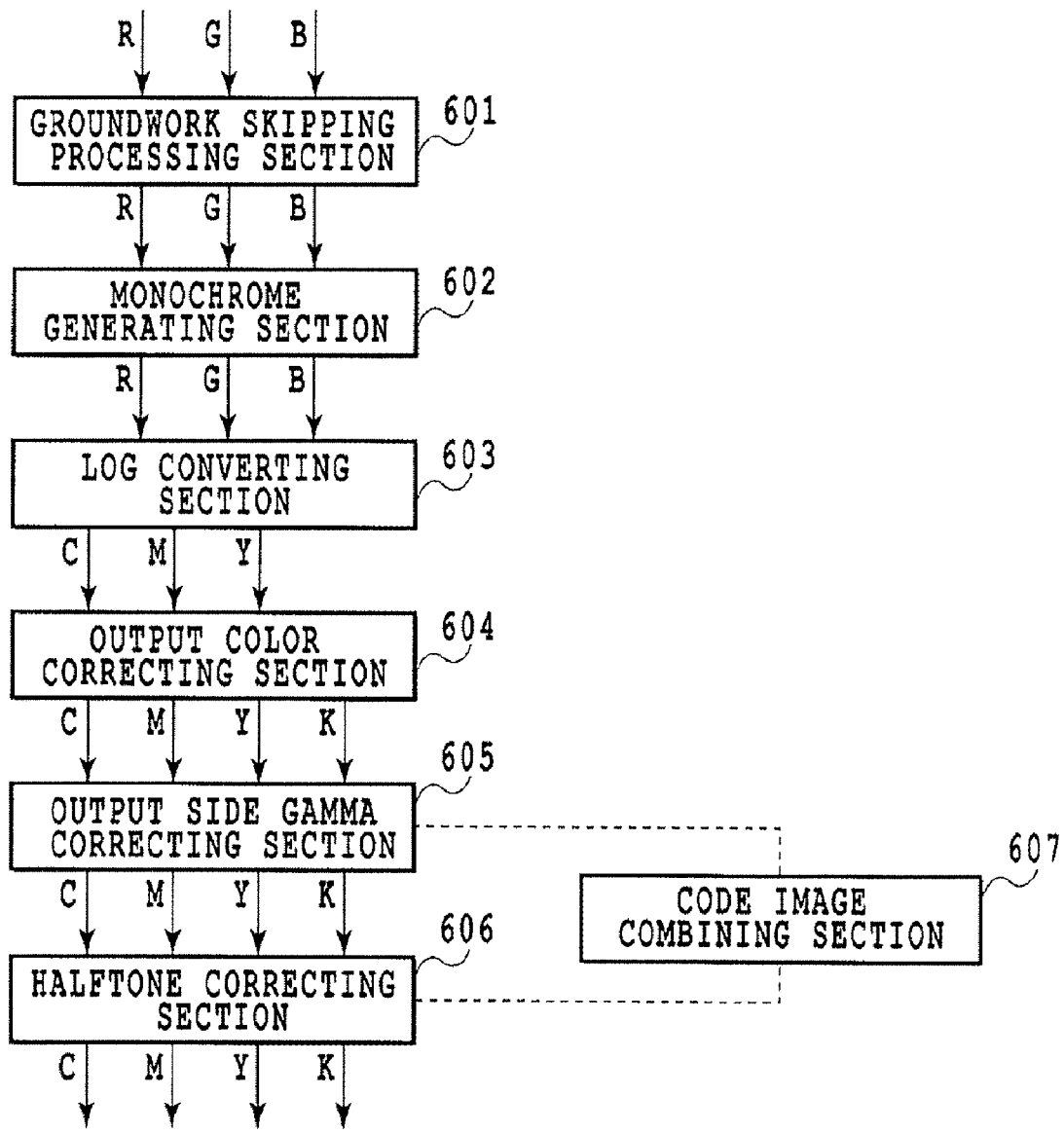
FIG. 6 is a block diagram showing a configuration of a printer image processing section of the first embodiment.

Here, the processing carried out by the printer image processing section 315 will be described. FIG. 6 illustrates a flow of the processing.

A groundwork skipping processing section 601 skips (removes) the groundwork color of the image data by using the histogram generated by the scanner image processing section 312. A monochrome generating section 602 converts the color data to the monochrome data. A Log converting section 603 carries out luminance level conversion. The Log converting section 603 converts the input RGB image data to CMY image data, for example.

An output color correcting section 604 carries out output color correction. For example, it converts the input CMY image data to CMYK image data by using a conversion table or matrix prepared in advance. An output side gamma correcting section 605 carries out correction in such a manner that the signal value input to the output side gamma correcting section 605 is proportional to a reflection level after the copy output. A code image combining section 607 combines the code image data generated in the following encoding processing of the CPU 301 with the (original document) image data. A halftone correcting section 606 performs halftone processing in accordance with the number of gray levels of the output printer section. For example, as for the received high gradient image data, it carries out digitization to two levels or 32 levels.

The individual processing sections in the scanner image processing section 312 or in the printer image processing section 315 can output the received image data without adding any processing. To pass the data through without adding any processing in the processing section is also called "through the processing section".

The CPU 301 can perform such control that enables generation of the code image data by carrying out encoding processing of prescribed information (the prescribed information includes the equipment number, print time information and user ID information, for example). In addition, the CPU 301 can perform such control that enables transmission of the generated code image data to the code image combining section 607 in the printer image processing section 315 via a data bus not shown. These types of control (code image generating control and transmission control) are carried out by executing the programs stored in the RAM 302.

In the present specification, the code image refers to an image such as a two-dimensional code image or bar code image, or to an electronic watermark image generated by electronic watermarking technology.

The above is the detailed description of the controller 11.

Next, the operation screen of the operating section 12 of the image forming apparatus 10 will be described.

FIG. 7 shows an initial screen in the operating section 12.

A region 701 indicates whether the image forming apparatus 10 accepts copy or not, and a number of copies set ("1" in FIG. 7). An original document selection tab 704 is a tab for selecting the type of the original document. Every time the tab is depressed, a pop-up selecting menu is displayed of the three types of text, photographic and text/photographic modes. A finishing tab 706 is a tab for carrying out settings associated with various types of finishing ("shift sorting" is set in FIG. 7). A duplex setting tab 707 is a tab for carrying out settings associated with duplex reading and duplex printing ("both sides" is set in FIG. 7).

A reading mode tab 702 is a tab for selecting a reading mode of the original document. Every time the tab is depressed, a pop-up selection menu is displayed of one of the three types of color/black/auto (ACS). When the color is selected, color copy is performed, and when the black is selected, monochrome copy is carried out. In addition, when the ACS is selected, the copy mode is decided according to the monochrome color decision signal described above. A region 708 is a tab for selecting processing of decoding and reencoding the code image. The decoding/reencoding processing will be described later.

Figure 8:
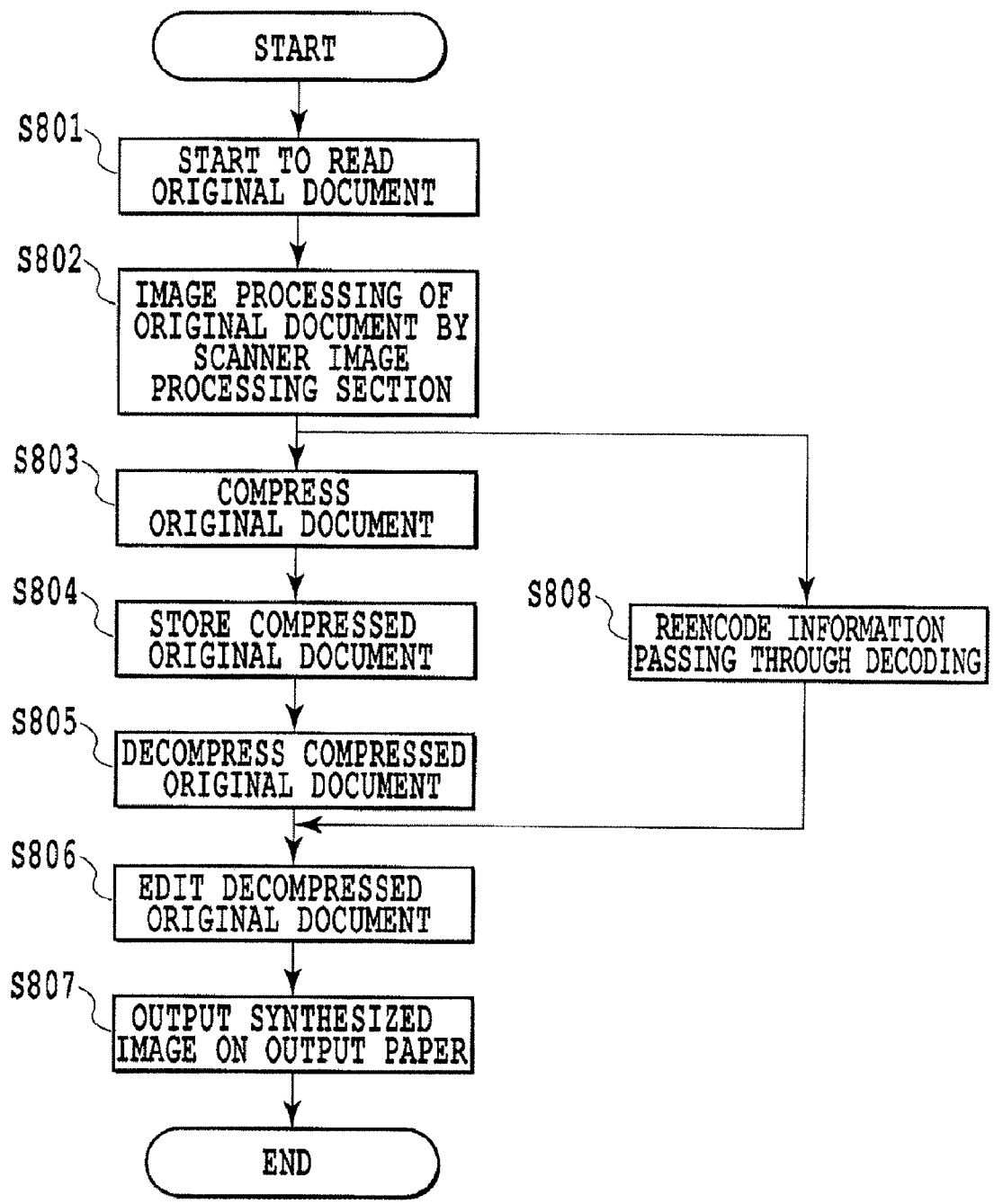
FIG. 8 is a flowchart illustrating decoding/reencoding processing of the first embodiment.

Next, the decoding/reencoding processing, which is carried out when the user depresses the start key after depressing the encoding/combining processing tab 708 shown in FIG. 7, will be described with reference to FIG. 8.

At step S801, the CPU 301 carries out control in such a manner as to send the original document read by the scanner section 13 to the scanner image processing section 312 via the scanner I/F 311 as the image data.

At step S802, the scanner image processing section 312 performs the processing as shown in the foregoing FIG. 5 on the image data to generate the new image data and attribute data. In addition, it annexes the attribute data to the image data. Furthermore, the decoding section 507 in the scanner image processing section 312 detects, when the code image data is present, its presence. Then, it decodes the detected code image data to obtain its information. Then, it transfers the decoded information obtained to the RAM 302 via the data bus not shown. When the processing at step S802 is completed, the processing at step S808 and step S803 is started at the same time.

At step S808, the CPU 301 reencodes the decoded information to generate the code image, and carries out control in such a manner as to transmit the generated reencoded image data to the code image combining section 607 in the printer image processing section 315.

At step S803, the compressing section 313 divides the new image data generated by the scanner image processing section 312 into blocks each consisting of 32 pixels×32 pixels to generate tile data. In addition, the compressing section 313 compresses the image data consisting of a plurality of tile data.

At step S804, the CPU 301 carries out control in such a manner as to transfer the image data compressed by the compressing section 313 to the RAM 302 to store it therein. Here, the image data is sent to the image converting section 317 as needed to undergo image processing, and is transferred to the RAM 302 again after the image processing.

At step S805, the CPU 301 carries out control in such a manner as to send the image data stored in the RAM 302 to the decompressing section 316. In addition, at the same step, the decompressing section 316 decompresses the image data. Besides, the decompressing section 316 carries out raster development of the image data consisting of a plurality of tile data after the decompression. The image data passing through the raster development is transferred to the printer image processing section 315.

At step S806, the printer image processing section 315 edits image data in accordance with the attribute data annexed to the image data. The processing is the one shown in FIG. 6. At this step, the code image data generated at step S808 are combined with the (original document) image data. More precisely, the code image combining section 607 combines the (original document) image data output from the output side gamma correcting section 605 with the reencoded image data generated at step S808. In this case, the reencoded image is combined in such a manner that it overwrites the detected code image in the original document. Thus, the code image initially placed in the original document is deleted, and only the newly combined reencoded image is left in the output image. Then, the halftone correcting section 606 carries out the halftone processing of the synthesized image data resulting from the combination in accordance with the number of gray levels of the output printer section. The synthesized image data passing through the halftone processing is sent to the printer section 14 via the printer I/F 314.

At step S807, the printer section 14 forms an image of the synthesized image data on output paper. The description so far is made by way of example in which the code image is already pre sent in the original document image, and which decodes the code image, encodes it again to obtain the new code image, and combines it further. However, it is assumed that even when no code image is present in the original document image, almost the same control is performed. In this case, it is assumed that the code image is generated using the foregoing prescribed information (which includes equipment number, print time information, and user ID information, for example), and that the generated code image is combined with the image data in the original document.

Next, the characteristic control in accordance with the present invention will be described.

When combining the code image at printing, it is conceivable that the information to be encoded has two types: one provided from the PC 40; and the other provided from the image forming apparatus 10. The information provided from the PC 40 is considered to include the computer name of the PC 40, IP address, MAC address, user ID information and the like. These information items are peculiar to the PC 40. On the other hand, the information provided from the image forming apparatus 10 is considered to include the serial number of the image forming apparatus 10, IP address, MAC address, user ID information and the like. These information items are peculiar to the image forming apparatus 10 as well.

Generally, it is considered convenient control to encode the information to be encoded separately at the place where it is provided such as that the information provided by the PC 40 is encoded in the PC 40, and the information provided by the image forming apparatus 10 is encoded in the image forming apparatus 10. However, performing such simple and easy control will bring about the result that the two code images, the code image generated by the PC 40 and the code image generated by the image forming apparatus 10, are combined in the output image.

When decoding the code image, the time taken for detecting the code image differs greatly between the processing of detecting it with the knowledge that the original document image includes only one code image and the processing of detecting it considering that the original document image may include a plurality of code images. This is because, in the former case, the detecting processing can be completed at the time when detecting only one code image. Accordingly, it is desirable for the original document image to include only one code image.

In addition, such processing is conceivable in which the PC 40 is notified of the information to be encoded which is provided by the image forming apparatus 10, and the PC 40 carries out encoding processing of all the information items to be encoded to generate a single code image. It offers an advantage of being able to reduce the time taken for the encoding processing by carrying out the encoding processing with the PC 40 having calculation processing performance higher than the image forming apparatus 10 in general. On the other hand, its drawback is that the load of the network increases because the code image with the amount of data greater than the amount of the information to be encoded itself is transferred on the network.

Furthermore, such processing is also conceivable in which the image forming apparatus 10 is notified of the information to be encoded which is provided by the PC 40, and the image forming apparatus 10 carries out encoding processing to generate a single code image. However, the HDD 304 installed in the image forming apparatus 10 can store the image passing through the raster processing performed on the basis of the PDL data. Thus, the time at which the PDL data is transmitted from the PC 40 to the image forming apparatus 10 and then undergoes the raster processing is not considered to always agree with the time at which the raster image is printed on paper. Accordingly, if "printed time" is designated as the information to be encoded, the PC 40 cannot encode that information. It must be encoded for the first time by the image forming apparatus 10 at the very time it is actually printed.

In the present embodiment, it is set in advance which of the PC 40 and image forming apparatus 10 should carryout the encoding processing. According to the setting, it is switched between 1) each of the PC 40 and image forming apparatus 10 generates the code image; 2) the PC 40 generates the code image; and 3) the image forming apparatus 10 generates the code image.

Next, referring to FIG. 9, the control for generating the code image in each of the PC 40 and the image forming apparatus 10 at the printing will be described. Here, the decoding and reencoding of the code image is not carried out. Only the control is performed in such a manner as to generate the code image by encoding the information to be encoded which the PC 40 and image forming apparatus 10 provide, and to combine it into the ordinary original document image.

At step S901, the PC 40 generates the code image by encoding prescribed information. The prescribed information here refers to information which the PC 40 is instructed to encode, that is, the information peculiar to the PC 40 such as the user ID information of the PC 40.

At step S902, the PC 40 transfers the ordinary original document image to the image forming apparatus 10 via the LAN 50.

At step S903, the PC 40 transfers the code image generated at step S901 to the image forming apparatus 10 via the LAN 50.

At step S904, the image forming apparatus 10 encodes the information peculiar to the image forming apparatus 10 and generates the code image. Here, the information peculiar to the image forming apparatus 10 includes the machine number of the image forming apparatus 10, for example.

At step S905, the image forming apparatus 10 develops the ordinary original document image sent from the PC 40 at step S902 to obtain the raster image data.

At step S906, the image forming apparatus 10 combines the two code images, the code image sent from the PC 40 and the code image generated by the image forming apparatus 10, with the raster image data obtained at step S905. The processing is the one shown in FIG. 6. After that, the image of the synthesized raster image data is formed on output paper.

Next, referring to FIG. 10, the control for generating the code image by only the PC 40 at the printing will be described. Here, the decoding and reencoding of the code image is not carried out. Only the control is performed in such a manner as to generate the code image by encoding the information to be encoded which the PC 40 and image forming apparatus 10 provide, and to combine it into the ordinary original document image.

At step S1001, the PC 40 inquires of the image forming apparatus 10 about the information to be encoded. The information to be encoded here refers to information which the image forming apparatus 10 is instructed to encode, that is, the information peculiar to the image forming apparatus 10 such as the machine number of the image forming apparatus 10.

At step S1002, in response to the inquiry from the PC 40 at step S1001, the image forming apparatus 10 transfers the information to be encoded to the PC 40 via the LAN 50.

At step S1003, the PC 40 encodes both the information peculiar to the PC 40 and the information transferred from the image forming apparatus 10 to generate a single code image.

Here, the information peculiar to the PC 40 includes the user ID information of the PC 40, for example.

At step S1004, the PC 40 transfers the ordinary original document image to the image forming apparatus 10 via the LAN 50.

At step S1005, the PC 40 transfers the code image generated at step S1003 to the image forming apparatus 10 via the LAN 50.

At step S1006, the image forming apparatus 10 develops the original document image sent from the PC 40 at step S1004 to obtain the raster image data.

At step S1007, the image forming apparatus 10 combines the code image sent from the PC 40 into the raster image data obtained at step S1006. The processing is the one shown in FIG. 6. After that, the image of the synthesized image data is formed on output paper.

Next, referring to FIG. 11, the control for generating the code image by only the image forming apparatus 10 at the printing will be described. Here, the decoding and reencoding of the code image is not carried out. Only the control is performed in such a manner as to generate the code image by encoding the prescribed information to be encoded which the PC 40 and image forming apparatus 10 provide, and to combine it into the ordinary original document image.

At step S1101, the PC 40 transfers the ordinary original document image to the image forming apparatus 10 via the LAN 50.

At step S1102, the PC 40 transfers the information to be encoded peculiar to the PC 40 to the image forming apparatus 10 via the LAN 50. The information to be encoded peculiar to the PC 40 here includes the user ID information of the PC 40, for example.

At step S1103, the image forming apparatus 10 collectively encodes the information transferred from the PC 40 at step S1102 and the information peculiar to the image forming apparatus 10 to generate a single code image.

At step S1104, the image forming apparatus 10 develops the ordinary original document image sent from the PC 40 at step S1101 to obtain the raster image data.

At step S1105, the image forming apparatus 10 combines the code image obtained at step S1103 into the raster image data obtained at step S1104. The processing is the one shown in FIG. 6. After that, the image of the synthesized image data is formed on output paper.

(Second Embodiment)

In the first embodiment, the switching between the PC 40 and the image forming apparatus 10 concerning which one of them should carry out the encoding processing is decided in advance according to the setting of the user. In the second embodiment, however, the switching is carried out in accordance with the amount of the information to be encoded.

Figure 12:
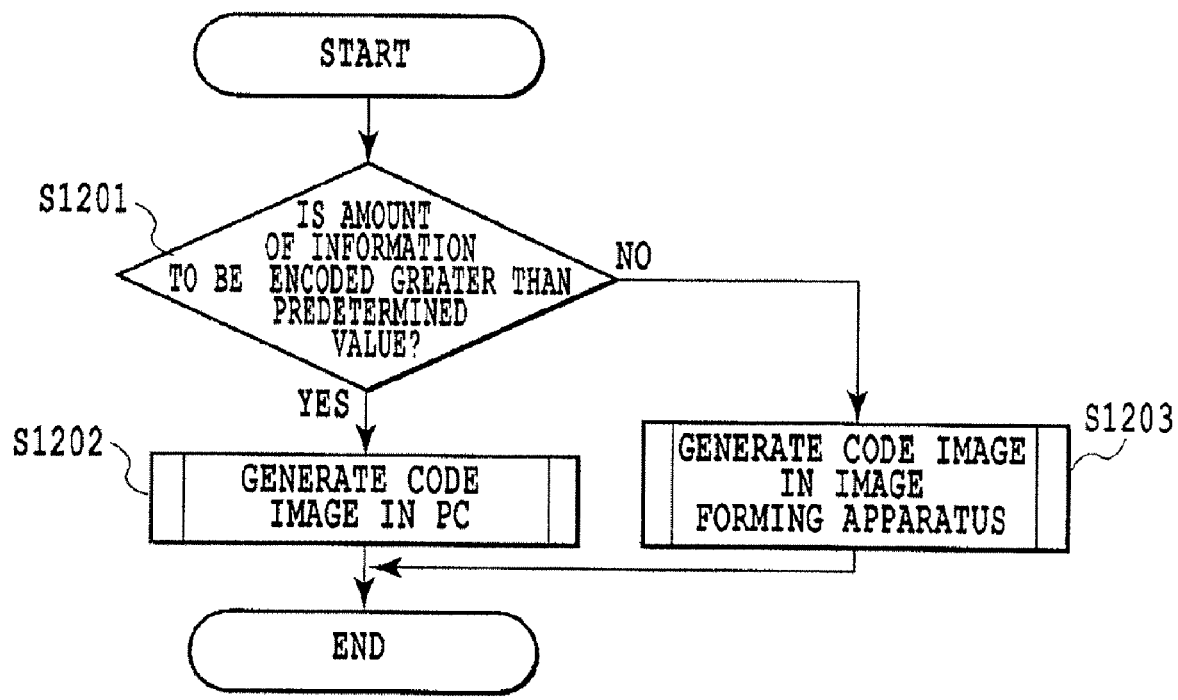
FIG. 12 is a flowchart illustrating switching control in a second embodiment.

Next, referring to FIG. 12, the switching control in the present embodiment will be described.

It is assumed in this case that both the PC 40 and image forming apparatus 10 carry out the switching control without mutual contradiction and in the same manner. Although only the control in the PC 40 is explained in the following description, the image forming apparatus 10 carries out exactly the same control.

At step S1201, the PC 40 makes a decision on whether the amount of the information to be encoded designated by the user is greater than a predetermined value or not. The term "information to be encoded designated" refers to the combination of the information designated by the PC 40 and the information designated by the image forming apparatus 10. It is assumed here that the PC 40 and the image forming apparatus 10 each recognize the entire information designated by both of them. This is achieved by the control method described in the first embodiment about the case where the PC 40 generates the code image and the image forming apparatus 10 generates the code image (S1001 and S1002 of FIGS. 10; and S1102 of FIG. 11).

If the amount of the information to be encoded is greater than the prescribed value, the control proceeds to step S1202, and if it is less than the prescribed value, the control proceeds to step S1203.

At step S1202, the PC 40 is switched so that the PC 40 generates the code image. In other words, the code image generating processing carries out the control for generating the code image by the PC 40 in the first embodiment.

At step S1203, the PC 40 is switched so that the image forming apparatus 10 generates the code image. In other words, the code image generating processing carries out the control for generating the code image by the image forming apparatus 10 in the first embodiment.

The foregoing control enables the switching between the PC 40 and the image forming apparatus 10 concerning which of them should carry out the encoding processing in accordance with the amount of the information to be encoded. Accordingly, it can perform the encoding processing in a shorter time.

In addition, the present embodiment is described by way of example that carries out, in proportion to the amount of the information to be encoded, the control of switching between the PC 40 and the image forming apparatus 10 concerning which of them should perform the encoding processing. However, a criterion for switching is not limited to it. For example, even if the encoding processing is completed in a short time using the PC 40, if the transfer rate of the LAN 50 at that time is small, the transfer of the code image takes a lot of time. As a result, the time for the print output to be obtained may be prolonged. In other words, it takes less time to transfer the information before encoding rather than to form the code image. Thus, even if the image forming apparatus 10 takes more time for encoding, the time the print output is obtained can become earlier as a consequence. Accordingly, paying attention to the effective transfer amount per unit time of the LAN 50 at that time, it is possible for the PC 40 to carry out the encoding processing if the effective transfer amount per unit time is greater than a prescribed value, and for the image forming apparatus 10 to do if it is less than the prescribed value. Since the flow of the control is the same as that of FIG. 12 described above, the detailed description thereof is omitted here.

In addition, it is also possible to perform switching control by combining the foregoing two conditions. More specifically, if the amount of the information to be encoded is greater than the prescribed value and if the effective transfer amount per unit time of the LAN 50 at that time is greater than the prescribed value, the PC 40 can carry out the encoding processing, and otherwise the image forming apparatus 10 can perform the encoding processing. Since the flow of the control is also the same as that of FIG. 12 described above, the detailed description thereof will be omitted here.

(Third Embodiment)

In the second embodiment, the switching between the PC 40 and the image forming apparatus 10 concerning which of them should carry out the encoding processing is performed in proportion to the amount of the information to be encoded or to the effective transfer amount per unit time of the LAN 50. In contrast with this, the present embodiment switches in accordance with the contents of the information to be encoded.

Figure 13:
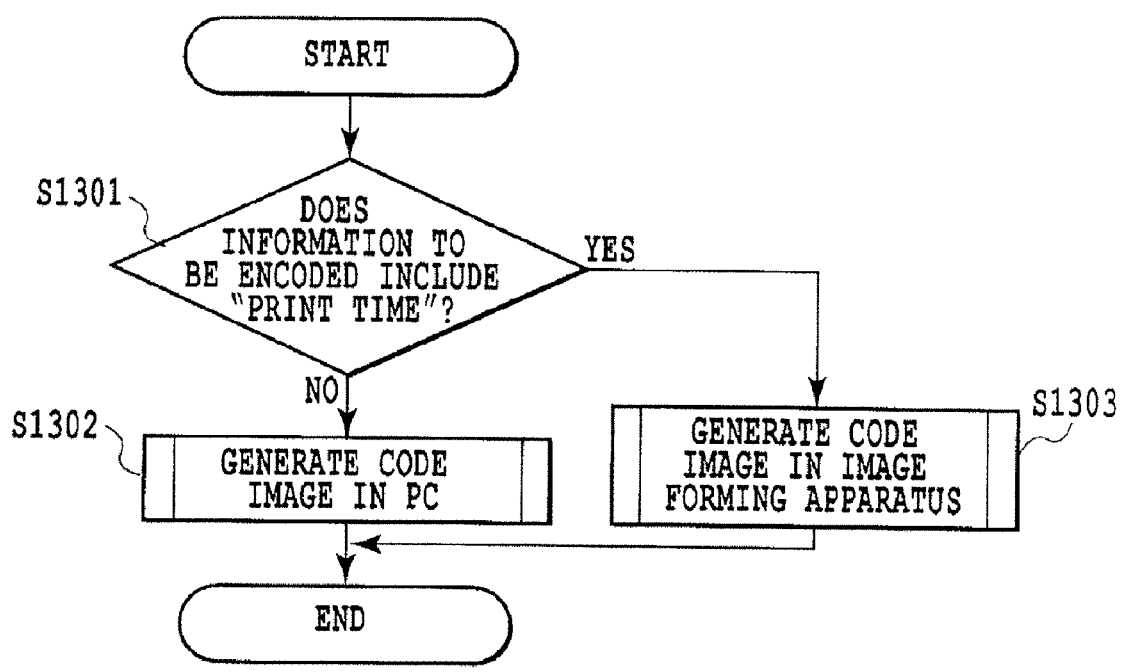
FIG. 13 is a flowchart illustrating switching control in a third embodiment.

Referring to FIG. 13, the switching control in the present embodiment will be described.

It is assumed in this case that both the PC 40 and image forming apparatus 10 carry out the switching control without mutual contradiction and in the same manner. Although only the control in the PC 40 is explained in the following description, the image forming apparatus 10 carries out exactly the same control.

First, it is assumed in the present embodiment that before the processing of FIG. 13, the user operating the PC 40 selects the information to be encoded using the operation screen as shown in FIG. 15.

More specifically, using a keyboard or mouse, the user places a check in a check box beside the information the user wishes to select as the information to be encoded.

Receiving the check by the user, the PC 40 decides the information associated with the check as the information to be encoded.

At step S1301, the PC 40 makes a decision on whether the information to be encoded includes the print time or not.

Unless the information to be encoded includes the print time, the control proceeds to step S1302, otherwise the control proceeds to step S1303.

Thus, if the information to be encoded includes the print time, the image forming apparatus rather than the PC 40 generates the code image. This is because it is only the image forming apparatus that actually carries out printing that can recognize the time actually printed.

Although the PC 40 can recognize the time at which it transmits data to the image forming apparatus, the transmission time is not the actual print time at all. In particular, when the image forming apparatus has a large amount of data to be printed before the present data from the PC 40, the transmission time differs greatly from the print time.

Therefore if the print time is included, the present embodiment has the image forming apparatus rather than the PC 40 generates the code image.

On the other hand, unless the information to be encoded includes the print time, the PC 40 rather than the image forming apparatus generates the code image. This is because the PC 40 has an encoding rate higher than that of the image forming apparatus.

At step S1302, the PC 40 generates the code image in itself. More specifically, the code image generating processing carries out the control for generating the code image by the PC 40 in the first embodiment. Thus, the PC 40 generates the code image according to the processing as shown in FIG. 9 or FIG. 10. In the case of FIG. 10, the PC 40 must carry out the processing of causing the image forming apparatus to transmit the information to be encoded before generating the code image.

Figure 10:
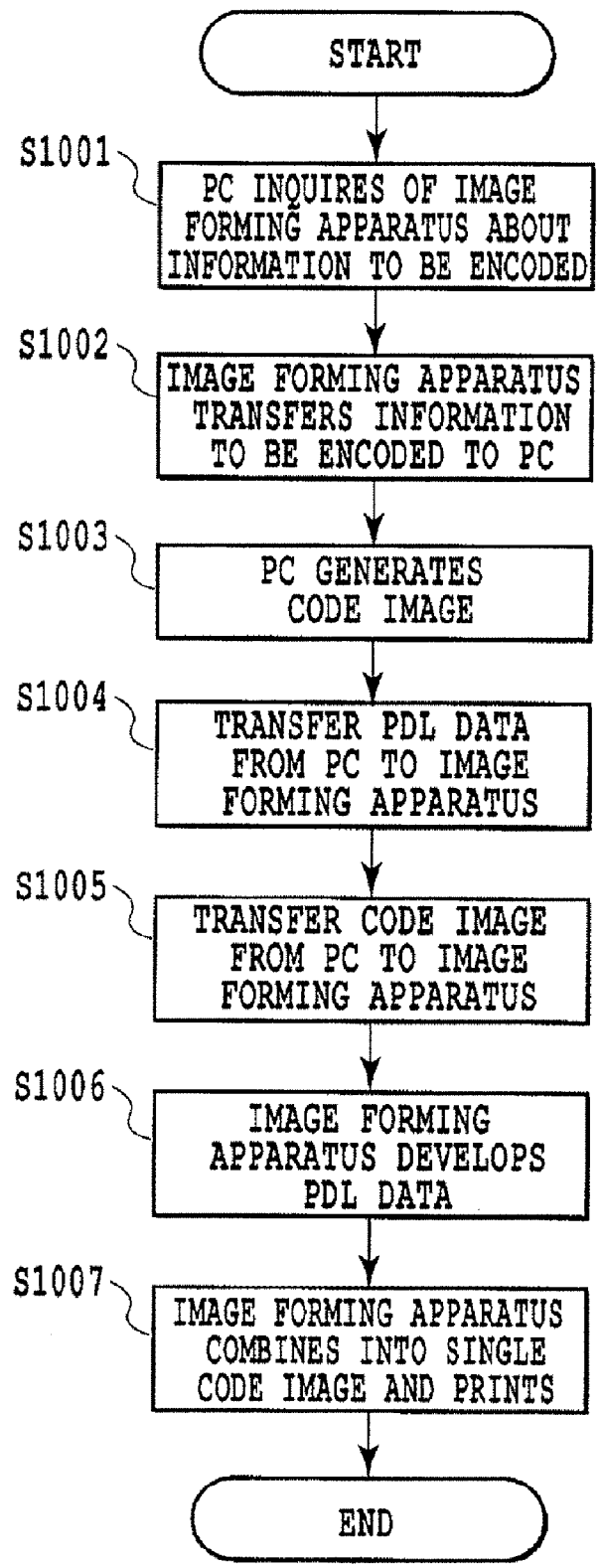
FIG. 10 is a flowchart illustrating control for generating a code image in the PC 40 of the first embodiment.

Incidentally, the processing shown in FIG. 10 is carried out only when the information to be encoded includes the information peculiar to the image forming apparatus. For example, it is when the user checks "information peculiar to the image forming apparatus", i.e. "user information of image forming apparatus" in the operation screen shown in FIG. 15.

Figure 9:
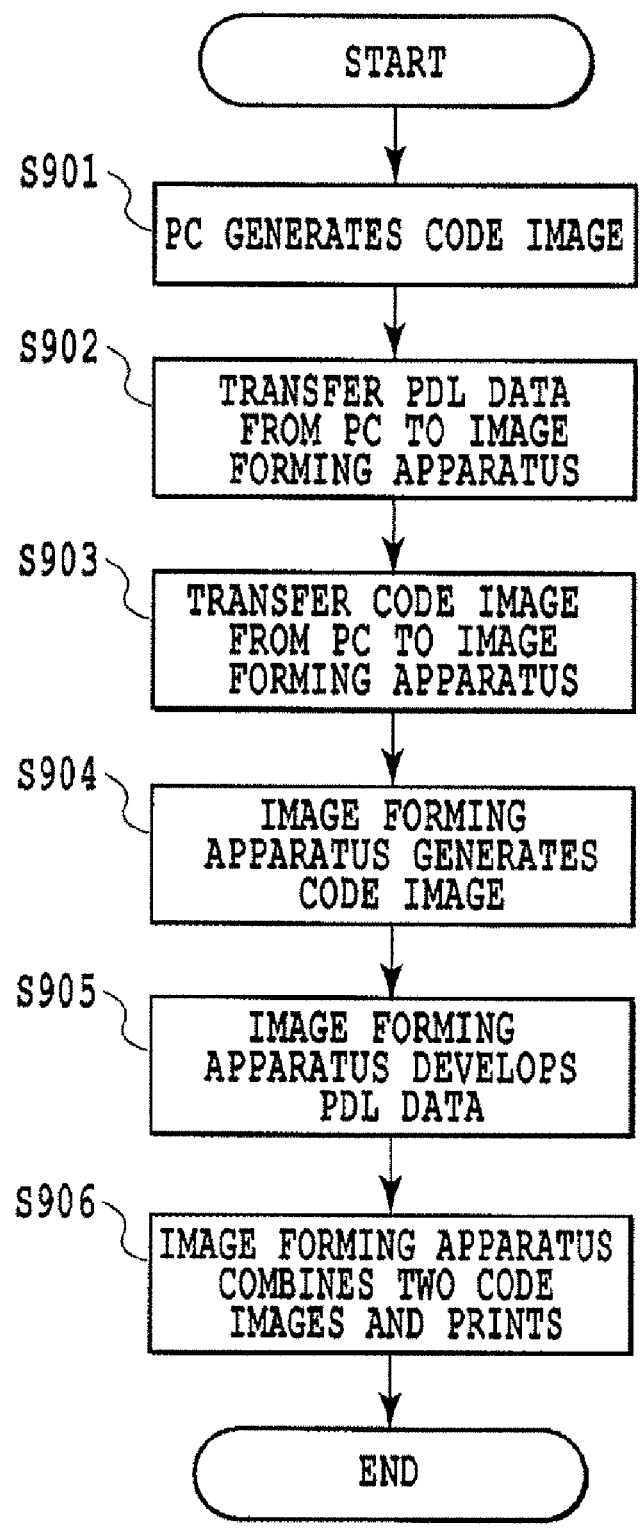
FIG. 9 is a flowchart illustrating control for generating a code image in each a PC 40 and an image forming apparatus 10 of the first embodiment.

In contrast, the processing shown in FIG. 9 is carried out when the information to be encoded does not include the information peculiar to the image forming apparatus. For example, it is when the user does not check "information peculiar to the image forming apparatus", i.e. "user information of image forming apparatus" in the operation screen shown in FIG. 15.

At step S1303, the PC 40 issues a command to generate the code image in the image forming apparatus 10. Thus, as shown in FIG. 11, the image forming apparatus carries out the processing of generating the code image.

Figure 11:
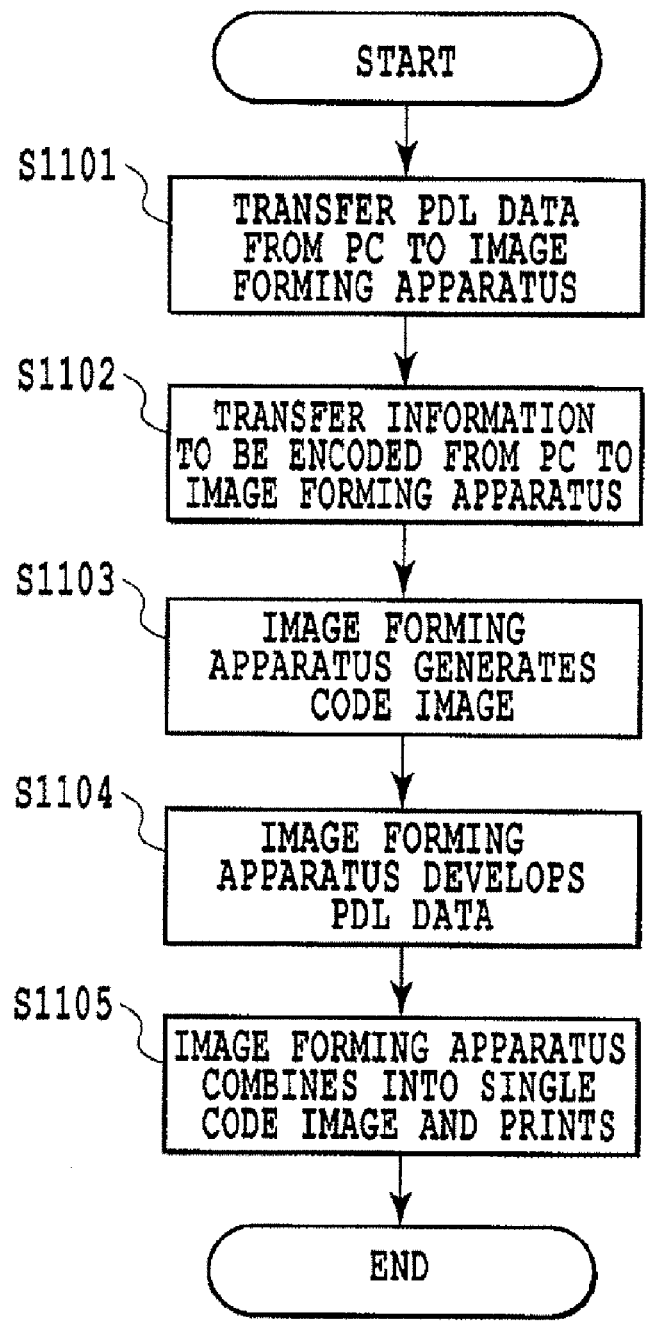
FIG. 11 is a flowchart illustrating control for generating a code image in the image forming apparatus 10 of the first embodiment.

At step S1101 in the processing shown in FIG. 11, the PC 40 transmits the ordinary original document image to the image forming apparatus.

At step S1102, the PC 40 transmits to the image forming apparatus the information peculiar to the PC 40 in the information to be encoded. Here, unless the information to be encoded includes the information peculiar to the PC 40, the information peculiar to the PC 40 is not transmitted.

In addition, at step S1102, the PC 40 transmits to the image forming apparatus the information indicating which information (that is, the information to be encoded) the user checks in the operation screen as shown in FIG. 15. In other words, PC 40 transmits to the image forming apparatus 10 a command to indicate which type of the information is to be encoded.

At step S1103, according to the type of the information to be encoded the PC 40 transmits, the image forming apparatus encodes the information to be encoded.

Incidentally, when the information to be encoded consists of only the information peculiar to the image forming apparatus, only the information peculiar to the image forming apparatus is encoded. Besides, when the information to be encoded includes, in addition to the information peculiar to the image forming apparatus, the information peculiar to the PC 40, the information peculiar to the PC 40 which is transmitted from the PC 40 at step S1102 and the information peculiar to the image forming apparatus are collectively encoded to generate the code image.

At step S1104, the image forming apparatus develops the original document image transmitted from the PC 40 into a raster to generate the raster image data.

At step S1105, the image forming apparatus combines the raster image data with the code image generated at step S1103, and forms on a sheet.

(Fourth Embodiment)

In the second embodiment and third embodiment, the switching between the PC 40 and the image forming apparatus 10 is performed in proportion to the amount of the information to be encoded or to the contents of the information to be encoded. In the present embodiment, the switching is performed in accordance with the combination of the amount of the information to be encoded and the contents of the information to be encoded, thereby trying to carry out more appropriate control.

Figure 14:
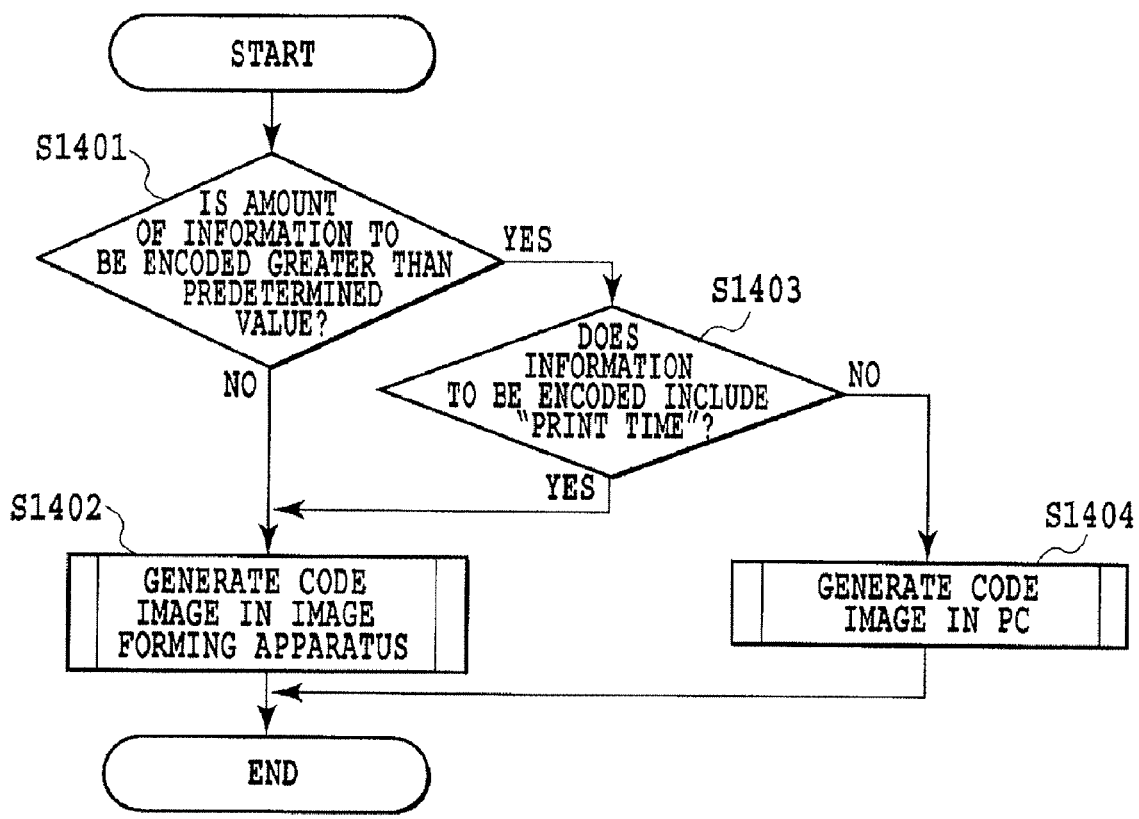
FIG. 14 is a flowchart illustrating switching control in a fourth embodiment.

Referring to FIG. 14, the switching control in the present embodiment will be described.

It is assumed in this case that both the PC 40 and image forming apparatus 10 carry out the switching control without mutual contradiction and in the same manner. Although only the control in the PC 40 is explained in the following description, the image forming apparatus 10 carries out exactly the same control.

At step S1401, the PC 40 makes a decision on whether the amount of the designated information to be encoded is greater than a predetermined value. The term "designated information to be encoded" here refers to a combination of the information designated by the PC 40 and the information designated by the image forming apparatus 10. It is assumed that the PC 40 and the image forming apparatus 10 each recognize the entire information designated by both of them. This is achieved by the control method described in the first embodiment about the case where the PC 40 generates the code image and the image forming apparatus 10 generates the code image (S1001 and S1002 of FIGS. 10; and S1102 of FIG. 11).

If the amount of the information to be encoded is greater than the prescribed value, the control proceeds to step S1403, and if it is less than the prescribed value, the control proceeds to step S1402.

At step S1403, the PC 40 makes a decision on whether the information to be encoded includes the print time or not. The term "designated information to be encoded" here refers to the information designated by the image forming apparatus 10. If the information to be encoded includes the print time, the control proceeds to step S1402, otherwise the control proceeds to step S1404.

At step S1402, the PC 40 is switched so that the image forming apparatus 10 generates the code image. Thus, the code image generating processing carries out the control for generating the code image with the image forming apparatus 10 in the first embodiment.

At step S1404, the PC 40 is switched so that the PC 40 generates the code image. Thus, the code image generating processing carries out the control for generating the code image with the PC 40 in the first embodiment.

Carrying out the foregoing control makes it possible to switch between the PC 40 and the image forming apparatus 10 concerning which of them should perform the encoding processing in accordance with the amount and contents of the information to be encoded, thereby being able to perform more appropriate switching control.

The present embodiment is described by way of example in which the amount of the information to be encoded and the contents of the information to be encoded are combined to control the switching between the PC 40 and the image forming apparatus 10 regarding which of them should perform the encoding processing in accordance with the combination. However, a criterion for switching is not limited to that. As described before, paying attention to the effective transfer amount per unit time of the LAN 50 at that time, it is possible for the PC 40 to carry out the encoding processing if the effective transfer amount per unit time is greater than a prescribed value, and for the image forming apparatus 10 to do if it is less than the prescribed value. Accordingly, it is also possible to perform the control of switching between the PC 40 and the image forming apparatus 10 concerning which of them should carry out the encoding processing by combining the contents of the information to be encoded and the effective transfer amount per unit time between the image forming apparatus 10 and the PC 40. Alternatively, it is possible to perform the control of switching between the PC 40 and the image forming apparatus 10 concerning which of them should carry out the encoding processing by combining the amount of the information to be encoded, the contents of the information to be encoded and the effective transfer amount per unit time between the image forming apparatus 10 and the PC 40.

(Other Embodiments)

Furthermore, the present invention is applicable to a system comprising a plurality of apparatuses (such as a computer, interface equipment, reader, printer and the like), and to an apparatus comprising a single device (such as a multifunction machine, printer, fax machine and the like).

In addition, the object of the present invention is also achieved by storing program code for implementing the procedures of the flowchart described in the foregoing embodiments in a storage medium; and by reading the program code therefrom with a computer (or CPU or MPU) of the system or apparatus. In this case, the program code itself read out of the storage medium implements the functions of the foregoing embodiments. Therefore the program code or the storage medium that stores the program code also constitutes one of the present invention.

As the storage medium for supplying the program code, a floppy disk, hard disk, optical disk, magneto-optical disk, CD-ROM, CD-R, magnetic tape, nonvolatile memory card, ROM and the like can be used.

Besides, not only the program alone that is stored in the storage medium and executes the processing, but also the program that operates on an operating system and carries out the operation of the foregoing embodiments in conjunction with a function of other software or of an expansion board falls into the category of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-318863, filed Nov. 27, 2006, which is hereby incorporated by reference herein in its entirety.

What is claimed is:

1. An information processing apparatus which processes information which is combined with document data as a code image, the information processing apparatus comprising:
   a deciding unit that decides whether the information processing apparatus is to generate a code image from the information or is to transmit the information to an image forming apparatus to cause the image forming apparatus to generate the code image from the information; and
   a processing unit that,
   when the deciding unit decides that the information processing apparatus is to generate the code image from the information, generates the code image from the information and transmits the code image and the document data to the image forming apparatus, and,
   when the deciding unit decides that the information processing apparatus is to transmit the information to the image forming apparatus to cause the image forming apparatus to generate the code image from the information, transmits the information and the document data to the image forming apparatus to cause the image forming apparatus to generate the code image from the information,
   wherein the information is information that includes at least information of the information processing apparatus,
   wherein when the deciding unit decides that the information processing apparatus is to generate the code image, the information processing apparatus acquires second information of the image forming apparatus and generates the code image from both the information of the information processing apparatus and the second information of the image forming apparatus, and
   wherein when the deciding unit decides that the information processing apparatus is to transmit the information to the image forming apparatus, the image forming apparatus generates the code image from both the information received from the information processing apparatus and the second information of the image forming apparatus.

2. The information processing apparatus as claimed in claim 1, wherein the deciding unit decides, according to contents of the information, whether the information processing apparatus is to generate the code image from the information or is to transmit, to the image forming apparatus, a command that causes the image forming apparatus to generate the code image from the information.

3. The information processing apparatus as claimed in claim 1, wherein the deciding unit decides, according to an amount of the information, whether the information processing apparatus is to generate the code image from the information or is to transmit, to the image forming apparatus, a command that causes the image forming apparatus to generate the code image from the information.

4. The information processing apparatus as claimed in claim 1, wherein the code image is at least one of a two-dimensional code, a bar code and an electronic watermark.

5. An image forming apparatus which receives at least the document data from the information processing apparatus of claim 1, the image forming apparatus comprising:
   a receiving unit that receives the document data and the generated code image when the deciding unit of the information processing apparatus decides that the information processing apparatus is to generate the code image, and receives the document data and the information to generate the code image when the deciding unit decides that the information processing apparatus is to transmit the information to the image forming apparatus to cause the image forming apparatus to generate the code image from the information;
   a generating unit that generates the code image from the information received by the receiving unit, when the deciding unit decides that the information processing apparatus is to transmit the information to the image forming apparatus;
   a combining unit that creates a combined result by combining the document data received by the receiving unit with the code image received by the receiving unit when the deciding unit decides that the information processing apparatus is to generate the code image, and creates a combined result by combining the document data received by the receiving unit with the code image generated by the generating unit when the deciding unit decides that the information processing apparatus is to transmit the information to the image forming apparatus; and
   an image forming unit that forms an image from the combined result from the combining unit.

6. A method for processing information which is combined with document data as a code image, the method comprising:
   deciding whether an information processing apparatus is to generate a code image from the information or is to transmit the information to an image forming apparatus to cause the image forming apparatus to generate the code image from the information; and
   when it is decided that the information processing apparatus is to generate the code image from the information, the information processing apparatus generates the code image from the information and transmits the code image and the document data to the image forming apparatus, and
   when it is decided that the information processing apparatus is to transmit the information to the image forming apparatus to cause the image forming apparatus to generate the code image from the information, the information processing apparatus transmits the information and the document data to the image forming apparatus to cause the image forming apparatus to generate the code image from the information,
   wherein the information is information that includes at least information of the information processing apparatus,
   wherein when it is decided that the information processing apparatus is to generate the code image, the information processing apparatus acquires second information of the image forming apparatus and generates the code image from both the information of the information processing apparatus and the second information of the image forming apparatus, and
   wherein when it is decided that the information processing apparatus is to transmit the information to the image forming apparatus, the image forming apparatus generates the code image from both the information received from the information processing apparatus and the second information of the image forming apparatus.

7. The method of claim 6, wherein the image forming apparatus which receives at least the document data from the information processing apparatus performs the following:
   receiving the document data and the generated code image when it is decided that the information processing apparatus is to generate the code image, and receiving the document data and the information to generate the code image when it is decided that the information processing apparatus is to transmit the information to the image forming apparatus to cause the image forming apparatus to generate the code image from the information;
   generating the code image from the received information, when it is decided that the information processing apparatus is to transmit the information to the image forming apparatus;
   combining the received document data with the received code image to create a combined result when it is decided that the information processing apparatus is to generate the code image, and combining the received document data with the generated code image to create a combined result when it is decided that the information processing apparatus is to transmit the information to the image forming apparatus; and
   forming an image from the combined result.

8. A non-transitory computer-readable medium retrievably storing a program, which when executed on an information processing apparatus, causes the information processing apparatus to perform a method for processing information which is combined with document data as a code image, the method comprising:
   deciding whether the information processing apparatus is to generate a code image from the information or is to transmit the information to an image forming apparatus to cause the image forming apparatus to generate the code image from the information; and
   when it is decided that the information processing apparatus is to generate the code image from the information, the information processing apparatus generates the code image from the information and transmits the code image and the document data to the image forming apparatus, and
   when it is decided that the information processing apparatus is to transmit the information to the image forming apparatus to cause the image forming apparatus to generate the code image from the information, the information processing apparatus transmits the information and the document data to the image forming apparatus to cause the image forming apparatus to generate the code image from the information, wherein the information is information that includes at least information of the information processing apparatus, wherein when it is decided that the information processing apparatus is to generate the code image, the information processing apparatus acquires second information of the image forming apparatus and generates the code image from both the information of the information processing apparatus and the second information of the image forming apparatus, and wherein when it is decided that the information processing apparatus is to transmit the information to the image forming apparatus, the image forming apparatus generates the code image from both the information received from the information processing apparatus and the second information of the image forming apparatus.

9. The computer-readable medium of claim 8, wherein the program further comprises instructions for causing the image forming apparatus which receives at least the document data from the information processing apparatus to perform the following:

receive the document data and the generated code image when it is decided that the information processing apparatus is to generate the code image, and receive the document data and the information to generate the code image when it is decided that the information processing apparatus is to transmit the information to the image forming apparatus to cause the image forming apparatus to generate the code image from the information;

generate the code image from the received information, when it is decided that the information processing apparatus is to transmit the information to the image forming apparatus;

combine the received document data with the received code image to create a combined result when it is decided that the information processing apparatus is to generate the code image, and combine the received document data with the generated code image to create a combined result when it is decided that the information processing apparatus is to transmit the information to the image forming apparatus; and form an image from the combined result.

\* \* \* \* \*